United States Patent
Foerder

(10) Patent No.: US 10,938,555 B2
(45) Date of Patent: Mar. 2, 2021

(54) METHOD AND ASSEMBLY FOR ESTABLISHING A SECURE COMMUNICATION BETWEEN A FIRST NETWORK DEVICE (INITIATOR) AND A SECOND NETWORK DEVICE (RESPONDER)

(71) Applicant: Phoenix Contact GmbH & Co. KG, Blomberg (DE)

(72) Inventor: Torsten Foerder, Lemgo (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 69 days.

(21) Appl. No.: 16/092,435

(22) PCT Filed: Mar. 22, 2017

(86) PCT No.: PCT/EP2017/056769
§ 371 (c)(1),
(2) Date: Oct. 9, 2018

(87) PCT Pub. No.: WO2017/178201
PCT Pub. Date: Oct. 19, 2017

(65) Prior Publication Data
US 2019/0132122 A1 May 2, 2019

(30) Foreign Application Priority Data

Apr. 11, 2016 (LU) ................................ LU93024

(51) Int. Cl.
*H04L 9/32* (2006.01)
*H04L 9/08* (2006.01)
*H04L 9/14* (2006.01)
*H04L 29/06* (2006.01)

(52) U.S. Cl.
CPC ............. *H04L 9/0838* (2013.01); *H04L 9/14* (2013.01); *H04L 9/3247* (2013.01); *H04L 9/3273* (2013.01); *H04L 63/0435* (2013.01)

(58) Field of Classification Search
CPC .................................................. H04L 63/0435
See application file for complete search history.

(56) References Cited

U.S. PATENT DOCUMENTS 9,143,331 B2   9/2015 Avanzi et al.
9,960,913 B2   5/2018 Pyka et al.
(Continued)

FOREIGN PATENT DOCUMENTS

CN   101420413 A   4/2009
CN   103560879 A   2/2014
(Continued)

OTHER PUBLICATIONS

English translation of International Search Report dated Jun. 23, 2017, issued in connection with International Application No. PCT/EP2017/056769 (2 pages total).
(Continued)

*Primary Examiner* — Josnel Jeudy
(74) *Attorney, Agent, or Firm* — John Maldjian; Maldjian Law Group LLC

(57) ABSTRACT

The invention relates to a method for establishing a secure communication between a first network device (initiator) and a second network device (responder) in a communication network and to an arrangement of network device suitable for this purpose, which are distinguished by using a symmetric cryptosystem in which both network devices each use the same secrets as keys for encrypting and decrypting data sets for performing a respective separate authentication with respect to the first and second network devices before generating a secret to be used as a shared key for the secure communication.

9 Claims, 8 Drawing Sheets

(56) References Cited

U.S. PATENT DOCUMENTS

| | | | | |
|---|---|---|---|---|
| 2002/0078345 A1* | 6/2002 | Sandhu | ............... | H04L 9/0825 713/155 |
| 2003/0120611 A1 | 6/2003 | Yoshino et al. | | |
| 2014/0149742 A1 | 5/2014 | Yau | | |
| 2014/0223182 A1* | 8/2014 | Avanzi | ............... | H04L 63/061 713/171 |

FOREIGN PATENT DOCUMENTS

| | | |
|---|---|---|
| CN | 103780618 A | 5/2014 |
| CN | 104506534 A | 4/2015 |
| CN | 104883681 A | 9/2015 |
| CN | 104956620 A | 9/2015 |
| DE | 10 2012 220 990 B3 | 1/2014 |

OTHER PUBLICATIONS

Menezes et al., "Chapter 12, 'Key Establishment Protocols' ", Handbook of Applied Cryptography, CRC Press Inc., 1997 (52 pages total).

C. Kaufmann et al., "RFC 5996 Internet Key Exchange Protocol Version 2", The Internet Engineering Task Force (IETF), 2010 (138 pages total).

T. Dierks and E. Rescorla, "RFC 5246 The Transport Layer Security (TLS) Protocol Version 1.2", The Internet Engineering Task Force, 2008 (104 pages total).

P. Eronen and H. Tschofenig,"RFC 4279 Pre-Shared Key Ciphersuites for Transport Layer Security (TLS)", The Internet Engineering Task Force, 2005 (15 pages total).

H. Krawczyk, M. Bellare and R. Canetti, "RFC 2104—HMAC: Keyed-Hashing for Message Authentication", Internet Engineering Task Force (IETF), 1997. (11 pages total).

International Preliminary Report on Patentability with transmittal dated Oct. 16, 2018 in connection with corresponding International Application No. PCT/EP2017/056769 (9 pages total).

Chinese Office Action and Search Report dated Oct. 9, 2020 issued in connection with corresponding Chinese Patent Application No. 201780029251.4 with English language translation (19 pages total).

Baidi Yang,"Cooperative Communication and Information Safety Technical Research in the Mobile Communication Network", Thesis for the Master degree in Engineering, Mar. 1, 2014 (Published Feb. 15, 2015)—with English language Abstract (found on p. 5 of the PDF or p. III of the PDF).

\* cited by examiner

METHOD AND ASSEMBLY FOR ESTABLISHING A SECURE COMMUNICATION BETWEEN A FIRST NETWORK DEVICE (INITIATOR) AND A SECOND NETWORK DEVICE (RESPONDER)

CROSS-REFERENCE TO RELATED APPLICATIONS

This application claims the benefit under 35 U.S.C. § 371 of International Application No. PCT/EP2017/056769 filed on Mar. 22, 2017, which in turn claims the benefit of Luxembourg application LU93024 filed on Apr. 11, 2016, the entire content of each of which is hereby incorporated by reference in its entirety.

FIELD

Embodiments of the invention relate to a method for secure communication between a first network device (initiator) and a second network device (responder) in a communication network, and to an arrangement of network devices suitable for this purpose, in particular between network devices in the form of embedded systems.

BACKGROUND

In the following description and the appended claims, network devices refer to devices that are able to communicate, via at least one network, with other devices both independently and when caused to do so by a user, and also to software components which have runtime environment access to and communicate with other devices via at least one network, both independently and when caused to do so by a user.

It is known that in certain cases the communication between network devices has been performed in a secure way, for example in order to ensure integrity, confidentiality, and/or availability of the communication.

Integrity of communication is compromised, for example, by interfering influences that corrupt communication contents, or by an active attack in which a third party modifies, suppresses, and/or adds communication contents to his advantage.

Confidentiality of communication is compromised, for example, when communication contents are inadvertently transmitted to the wrong addressee, or when an attacker can find out communication contents.

Availability is compromised, for example, when inadvertently or intentionally recourse is made to communication resources by network devices with which no communication is intended or desired, so that there are not enough resources left for communication with the intended or desired network devices. Resources may include memory or computing speed, for example, and in particular embedded systems are often limited in their resources.

For example, a network device embodied as an embedded system is a network device involved (embedded) in a technical context, which is therefore typically subject to highly restrictive limiting conditions and has only greatly reduced resources.

For providing secure communication, manifold prior art is existing. Usually, when establishing a connection, communication partners mutually prove their identity and authenticate each other, that is to say they hand over information that allows a verification of the identity by the respective other communication partner, whereupon the respective other communication partner checks whether the alleged identity can be confirmed by the authentication data, i.e. performs an authentication. Furthermore, the communication partners typically create temporary shared secrets prior to the authentication, during or subsequent to the authentication, and these secrets are used to render messages secure. The temporary shared secrets are used for authentication and/or to encrypt the messages exchanged after authentication.

In this case, the network devices acting as communication partners can usually use their own identity with own secrets for authentication, and alternatively or additionally also the identity of their user on his initiative together with his secrets.

The Internet Engineering Task Force (IETF) standard, for example, describes a method abbreviated IKEv2 ("RFC 5996 Internet Key Exchange Protocol Version 2", C. Kaufmann, P. Hoffmann, Y. Nir, and P. Eronen; The Internet Engineering Task Force (IETF), 2010). Referring to the attached FIG. 3 which shows a basic scheme for communication establishment according to IKEv2, when setting up a communication according to this method, two network devices acting as communication partners initially generate a first temporary shared secret called SKEYSEED through a so-called Diffie-Hellmann key exchange. One of the network devices, referred to as initiator in FIG. 3, initiates the communication, and the other one, referred to as responder in FIG. 3, responds to this initiation.

SKEYSEED is then authenticated using permanent secrets PrivKey-I, PrivKey-R associated with known identities, which involves that the communication partners exchange signatures AUTH-I, AUTH-R relating to the messages exchanged for the Diffie-Hellmann key exchange, the signatures being generated using the permanent secrets and verified, i.e. authenticated, by the respective other communication partner using verification criteria CERT-I, CERT-R. For this purpose and subsequently, each of the communication partners derives, from SKEYSEED, a second temporary shared secret which is used as a composition of a plurality of cryptographic keys (e.g. SK_d, SK_ai, SK_ar, SK_ei, SK_er, SK_pi, SK_pr), some of which are used for authentication and some are used to encrypt particular further messages. Different keys are used, depending on the direction of communication. Optionally, each communication partner subsequently derives, from a part of the second shared secret SK_d, a third temporary shared secret (called KEYMAT, not included in FIG. 3 for reasons of clarity) which is a composition of a plurality of cryptographic keys (such as, e.g., keys called SK2_ei, SK2_ai, SK2_er, and SK2_ar). The deriving of the second and third temporary shared secrets is performed according to algorithms that were agreed on at the beginning of the communication setup.

An overview of the reference signs contained in FIG. 3 is given in the following list.

i: secret random number chosen by the initiator;
M1: first message, containing:
KEi: key exchange data generated by the initiator;
Ni: random number chosen by the initiator for single use;
r: secret random number chosen by the responder;
M2: second message, containing:
KEr: key exchange data generated by the responder;
Nr: random number chosen by the responder for single use;
SKEYSEED: first temporary shared secret—variable for calculating the second temporary shared secret, containing a plurality of secrets/keys, including:

SK_d: secret key for deriving further keys;
SK_ai: secret key for authenticating messages transmitted by the initiator;
SK_ar: secret key for authenticating messages transmitted by the responder;
SK_ei: secret key for encrypting messages transmitted by the initiator;
SK_er: secret key for encrypting messages transmitted by the responder;
SK_pi: secret key for initializing a pseudorandom number generator for use by the initiator;
SK_pr: secret key for initializing a pseudorandom number generator for use by the responder;
PrivKey-I: private key of the initiator (permanent secret);
CERT-I: certificate of identity of the initiator—contains the public key of the initiator;
PrivKey-R: private key of the responder (permanent secret);
CERT-R: certificate of identity of the responder—contains the public key of the responder;
M3: third message;
IDi: identity of the initiator;
AUTH-I: data used by the initiator to authenticate itself;
M4: fourth message;
IDr: identity of the responder;
AUTH-R: data used by the responder to authenticate itself.

Permanent secrets are referred to as permanent herein because they are usually used for multiple connection setups and are rarely changed, while the temporary secrets are used only for a short time, for example no longer than for a single communication relationship. For example, the relevant aforementioned IETF standard explicitly states that the generated temporary secrets of different communication protocols must only be applied for a particular duration and amount of data, and subsequently, new temporary secrets must be used.

However, for the Diffie-Hellmann key exchange performed in this case, computations such as exponentiations with large integers are required at the beginning of the IKEv2 communication setup, each of which usually requires significantly more bits for storage than fit into the register of a commonly used processor. Thus, IKEv2 inevitably requires rather high resources of main memory and computational time at the beginning of connection setup, which are scarcely available, especially in embedded systems. Furthermore, for real-time systems (i.e. systems for directly controlling and executing processes in which a particular result must be reliably available within a predetermined time interval), the requirement of computational time is problematic because, typically, short response times are needed. Industrial controllers are typically embedded real-time systems with limited resources and fast response time.

Especially for small embedded systems with very small resources, it is particularly disadvantageous that just at the beginning of the communication setup, when identities are not yet known, the resource-demanding Diffie-Hellmann key exchange has to take place. The latter has to be performed before the network devices are able to determine, from the subsequently exchanged identity, whether the connection setup with the other network device is desired or intended. Although the delayed exchange of identities according to the IKEv2 principle opens up the possibility of encrypting the identities with existing shared temporary keys and thus transmitting them in a reasonably confidential manner, however, in the case of very small resources the prevailing drawback is that, accidentally or intentionally, any network devices can cause the beginning of the communication setup and may thus cause particularly easily high resource usage on an embedded device, without being authorized therefore and without being easily distinguished from unwanted network devices.

Patent document DE 10 2012 220 990 B3 discloses a method and an arrangement in which two network devices generate, through a number of steps, a third shared secret KE, KA for secure communication. Referring to the accompanying FIG. 4 which shows a basic scheme for communication setup according to DE 10 2012 220 990 B3, a first shared secret GS as well as a first algorithm and a second algorithm are stored in advance in both network devices. For establishing a secure communication between the two network devices, the one network device, the "initiator", then transmits a first data item SD, for example its serial number, in a first message M1, to the other network device, the "responder". Both network devices then generate a second secret PS from the first data item SD using the first shared secret GS and the first algorithm. Then, the other network device transmits a second data item R in a second message M2, for example a random number, to the one network device. Based on this, both network devices compute the third shared secret KE, KA using the second shared secret PS and the second algorithm. The third shared secret KE, KA is then used to secure the subsequent communication, for example for authentication and/or encryption thereof.

An overview of the reference signs contained in FIG. 4 is given in the following list.
SD: first data item;
M1: first message;
GS: first shared secret;
R: second data item;
M2: second message;
PS: second shared secret;
KE, KA: third shared secret.

Thus, an authentication of the network devices only occurs during the secure communication implicitly by using the correct third secret KE, KA. Since, if one of the two network devices would not be aware of the first shared secret GS, a third shared secret KE, KA would not be created with a certain probability depending on the quality of the algorithms, rather, the network devices would have different values as a result. Consequently, the messages exchanged subsequently and secured using one of the variants of the third shared secret KE, KA can be authenticated and/or decrypted only with that variant of the third shared secret with which they were signed and/or encrypted. Without a third shared secret, there would therefore be no secure communication, and possibly even no further possibility of communication, depending on the communication protocol.

Furthermore, it is at least very complicated in this method to distinguish between two error cases when different third shared secrets have actually been produced. For example, it is questionable whether such different third shared secrets have been generated due to a confusion, or whether the messages exchanged for computing them had been altered during transmission, inadvertently, for example by interferences, or intentionally, for example by third parties.

For example, confusion can easily arise during setup of a connection with a network device if accidentally a wrong production cell is addressed and the production cells are configured and parameterized similarly, as is usually the case in series machine construction. In this case, network devices would possibly only differ in the first shared secret stored in advance.

A further drawback of this method is that, first, all of the steps of the procedure have to be executed by the two network devices before errors can be detected on the basis of a third secret that does not correspond. During connection setup, resources and algorithms will therefore be in use for all of the steps and will not be available for other connection setups.

A further prior art is the so-called Transport Layer Security Protocol, short TLS protocol or TLS, as explained in version 1.2 (e.g. in "RFC 5246 The Transport Layer Security (TLS) Protocol Version 1.2", T. Dierks and E. Rescorla, The Internet Engineering Task Force, 2008), which summarizes two different procedures of mutual authentication.

In these two TLS methods for mutual authentication, the two communication partners, called client and server in this case, store in advance an asymmetrical key pair consisting of a respective individual private key, i.e., when referring to FIGS. 5 and 6, Pc for the client, and Ps for the server, and a corresponding public key in a certificate, i.e., when referring to FIGS. 5 and 6, the certificate Cc for the client, and the certificate Cs for the server, wherein the certificate also indicates the respective identity.

In the first one of these procedures, according to FIG. 5 which shows a basic scheme for establishing a communication according to TLS without Diffie-Hellman, the communication partners first exchange random numbers they have generated, Rc and Rs, respectively, (Rc by the client, and Rs by the server) and the identities together with the associated public key in the form of certificates Cc and Cs. The communication partner initiating the connection, the client, authenticates itself using an asymmetrical signature AuthC for the previously exchanged data Rc, Rs, Cs, which it generates with its private key and which is verified (authenticated) by the other communication partner, the server, using the public key Cc transmitted together with this asymmetrical signature AuthC. In addition, the client generates, from further random numbers, a first shared secret ("premaster secret"), short pms in FIG. 5, and transmits it to the other communication partner as an encrypted value, designated Epms in FIG. 5. The encryption of pms into Epms is performed using the public key from the certificate Cs of the server. Thereby, the identity of the server is implicitly authenticated, since it is only the server which is able to decrypt the correct value of pms using its private key Ps, to subsequently determine a correct second shared secret "master secret", abbreviated ms in FIG. 5. Since both communication partners will then independently generate the second shared secret ms, from the combination of pms and the random numbers Rc and Rs exchanged during the preceding communication, using algorithms that were negotiated in the previous communication. From ms, both the client and the server derive a third shared secret in the form of a combination of cryptographic keys (cwMk, swMk, cwk, swk, cwl, swl), which serves for authentication and/or encryption of the subsequent communication. For this authentication and/or encryption and for deriving the third shared secret, algorithms are again used which were initially negotiated when exchanging the identities.

An overview of the reference signs contained in FIG. 5 is given in the following list.
Ps: private key of the server;
Pc: private key of the client;
M1: first message;
Rc: random number generated by the client;
M2: second message;
Rs: random number generated by the server;
Cs: certificate of the server;
pms: first shared secret;
M3: third message;
Cc: certificate of the client;
Epms: encrypted first shared secret;
AuthC: data used by the client to authenticate itself;
VDc: verification data transmitted by the client;
ms: second shared secret;
M4: fourth message;
VDs: verification data transmitted by the server;
cwMk: (client write MAC key)—component of the third shared secret;
swMk: (server write MAC key)—component of the third shared secret;
cwk: (client write key)—component of the third shared secret;
swk: (server write key)—component of the third shared secret;
cwI: (client write initialization vector)—component of the third shared secret;
swI: (server write initialization vector)—component of the third shared secret.

It is in fact advantageous in this procedure according to TLS that the identities are exchanged at the beginning of the procedure, before appreciable computing time and resources have been consumed. Accidentally misdirected communication partners can therefore be rejected with low utilization of resources.

However, a particular drawback with regard to the protection effect of this procedure according to TLS is that it depends solely on the trustworthiness of the client that the first shared secret pms is really a secret, because only the client determines the value of pms. Therefore, the method is rarely used today.

In the second one of these procedure, according to FIG. 6 which shows a basic scheme for establishing communication according to TLS with Diffie-Hellman, the client and the server again exchange random numbers Rc and Rs and the certificates Cs and Cc. Together with the certificate Cs, the server also transmits a value Ys for the Diffie-Hellmann key exchange, which it derives from the value pYs which it previously generated and which it keeps completely secret. For transmission, it supplements the derived value Ys by a signature. The combination of Ys and the signature is designated SYs in FIG. 6. The signature is created by the server using its private key Ps. It is verified by the client using the certificate Cs, so that thereby the identity of the server is authenticated to the client and the client has the authenticated value Ys. The client also generates a value pYc that is only known to itself, and, based thereon, generates a second value Yc for the Diffie-Hellman exchange. Furthermore, it directly derives the first shared secret pms from pYc and Ys. Together with its certificate Cc, the client transmits the value Yc to the server in non-encrypted form, together with a signature AuthC for all previously exchanged messages. The client creates this signature using its private key Pc, and the server checks it using the certificate Cc. Once it has received Yc, the server also generates the first shared secret pms, from the combination of pYs and Yc. Both the client and the server calculate the second shared secret ms from pms in combination with the previously exchanged random numbers Rc and Rs and derive therefrom the third shared secret which is a combination of cryptographic keys (cwMk, swMk, cwk, swk, cwl, swl) that is used for authentication and/or encryption of the subsequent communication. In the key negotiation according to Diffie-Hellmann, algorithms that were negotiated during the communication setup between client and server are used for generating the first, second, and third shared secrets and in the subsequent application of the cryptographic keys.

An overview of the reference signs contained in FIG. 6 is given in the following list.
Ps: private key of the server;
Pc: private key of the client;
M1: first message;
Rc: random number generated by the client;
pYs: secret initial value of the server for Diffie-Hellmann key exchange;
Ys: derived public initial value of the server for Diffie-Hellmann key exchange;
M2: second message;
Rs: random number generated by the server;
Cs: certificate of the server;
SYs: derived public initial value of the server for Diffie-Hellmann key exchange combined with a signature of the server;
pYc: secret initial value of the client for Diffie-Hellmann key exchange;
M3: third message;
Cc: certificate of the client;
AuthC: data used by the client to authenticate itself;
VDc: verification data transmitted by the client;
Yc: derived public initial value of the client for Diffie-Hellmann key exchange;
pms: first shared secret;
ms: second shared secret;
M4: fourth message;
VDs: verification data transmitted by the server;
cwMk: (client write MAC key)—component of the third shared secret;
swMk: (server write MAC key)—component of the third shared secret;
cwk: (client write key)—component of the third shared secret;
swk: (server write key)—component of the third shared secret;
cwI: (client write initialization vector)—component of the third shared secret;
swI: (server write initialization vector)—component of the third shared secret.

A drawback of this second procedure according to TLS is that for generating the value SYs the server employs asymmetric cryptography without yet being aware of the identity of the client, namely at the beginning of the Diffie-Hellman exchange and when creating the signature for Ys, so that it uses memory and computational resources to an extent that is already significant for embedded devices. Hence, this resource consumption will also be caused in the case of accidentally or intentionally misdirected connection setups and can hardly be counteracted.

A further drawback of both procedures according to TLS is that in both cases asymmetric cryptography is required for authentication, and therefore arithmetic operations with large integers, which particularly occupies memory and computational time.

In addition to the TLS procedures described above, three more TLS variants which also achieve mutual authentication of the communication partners are described in "RFC 4279 Pre-Shared Key Ciphersuites for Transport Layer Security (TLS)", P. Eronen and H. Tschofenig, The Internet Engineering Task Force. While two of them again use asymmetric cryptography, there is a procedure referred to as "PSK Key Exchange Algorithm" in "RFC 4279 Pre-Shared Key Ciphersuites for Transport Layer Security (TLS)" and designated "TLS with PSK" when referring to FIG. 7 which shows a basic scheme for establishing communication according to TLS with PSK, which gets along with symmetric cryptography in which case the first shared secret is a value stored in advance in both communication partners.

Specifically, referring again to FIG. 7, at the beginning of the "TLS with PSK" procedure, the client and the server exchange the random numbers Rc and Rs and the identities IDh as an information to the identity of the server and IDc as the identity of the client. Both entities then use a shared secret PSK they had previously stored, to create a second shared secret pms (pre-master secret). They use the second shared secret to generate, from the random numbers Rc and Rs, a third shared secret ms (master secret). The third shared secret ms, in turn, is used by both the client and the server to generate a fourth shared secret which is a combination of cryptographic keys (cwMk, swMk, cwk, swk, cwI, swI) that is used for authentication and/or encryption of the subsequent communication. For this authentication and/or encryption and for deriving the first, second, third and fourth shared secrets, algorithms are used which were initially negotiated during the exchange of the random numbers.

An overview of the reference signs contained in FIG. 7 is given in the following list.
PSK: first shared secret stored in advance;
M1: first message;
Rc: random number generated by the client;
M2: second message;
Rs: random number generated by the server;
IDh: information to the identity of the server;
pms: second shared secret;
ms: third shared secret;
M3: third message;
VDc: verification data transmitted by the client;
IDc: information to the identity of the client;
M4: fourth message;
VDs: verification data transmitted by the server;
cwMk: (client write MAC key)—component of the fourth shared secret;
swMk: (server write MAC key)—component of the fourth shared secret;
cwk: (client write key)—component of the fourth shared secret;
swk: (server write key)—component of the fourth shared secret;
cwI: (client write initialization vector)—component of the fourth shared secret;
swI: (server write initialization vector)—component of the fourth shared secret.

A drawback of this "TLS with PSK" procedure is that although an identification of the communication devices is performed, explicit authentication is not. When one party only pretends its identity or confuses it, but does not know the associated shared secret, then different keys for authentication and/or encryption of the subsequent communication will be resulting at the end. Hence, in this method, again, it is complicated to subsequently distinguish the two error cases that were discussed above in conjunction with the method according to patent DE 10 2012 220 990 B3: When different second secrets were produced, it is questionable whether this was due to a confusion, or whether the messages exchanged for computing them had been altered during transmission, inadvertently, for example by interferences, or intentionally, for example by third parties.

In "OPC Unified Architecture Part 2: Security Model", 2009, "OPC Unified Architecture Part 4: Services", 2009, and "OPC Unified Architecture Part 6: Mappings," 2009, the OPC Foundation describes a procedure for the OPC Unified Architecture (OPC UA) in which two communication partners, a client and a server, mutually authenticate each other in order to finally communicate securely using shared secrets.

Referring to FIG. 8 which shows a basic scheme for establishing a secure connection according to OPC UA, the client has already gained knowledge in this case, prior to or at the beginning of the communication, about a certificate Cs of the server which contains the identity and the public key of the server. Before communication begins, the client and the server each possess an asymmetric key pair, i.e. a respective individual private key and a corresponding public key in a certificate, as well as the associated certificate which they can use to prove their identity.

In a first message M1 of the authentication process, the client transmits, to the server, its certificate Cc containing its identity and its public key, together with a value Nc and a signature AuthC. The signature AuthC is generated by the client as a digital signature for relevant parts of the message M1, comprising at least the certificate Cc and the value Nc, using its private key Pc associated with the certificate Cc. Before sending the message M1, the client encrypts parts of the message, at least the value Nc and the signature AuthC, using the public key of the server from the certificate Cs, so that instead of the value Nc actually its encryption eNc is transmitted, and instead of the signature AuthC actually its encryption eAuthC. The server decrypts the message M1 using its private key Ps associated with the certificate Cs, and verifies the signature AuthC using the public key from this certificate Cc. Together with the verification of the certificate Cc, the server obtains reliable knowledge about the identity of the client and knowledge of the secret random number Nc.

Similarly, in a second message M2 the server transmits to the client a value Ns together with a signature AuthS. The signature AuthS is generated by the server as a digital signature for relevant parts of the message M2, at least including the value Ns and a checksum or other referencing of the certificate Cs. Before sending the message M2, the server encrypts parts of the message, at least the value Ns, using the public key of the client from the certificate Cc. The client decrypts the message M2 using its private key Pc and verifies the signature AuthS using the public key from the certificate Cs. Together with the verification of the certificate Cs, the client also obtains reliable knowledge about the identity of the server and knowledge of the secret random number Ns.

After the exchange of the messages M1 and M2, the client and the server each derive a shared secret G from the exchanged secret random numbers Nc and Ns. This shared secret is used as a combination of a plurality of cryptographic keys for authenticating or for authenticating and encrypting the subsequent communication. The algorithms used for deriving and the algorithms for the subsequent authentication and/or encryption of the communication are determined during the exchange of messages M1 and M2.

An overview of the reference signs contained in FIG. 8 is given in the following list.
Ps: private key of the server;
Pc: private key of the client;
Cs: certificate of the server;
Nc: random number generated by the client;
AuthC: signature generated by the client;
M1: first message;
Cc: certificate of the client;
eNc: encryption of Nc;
eAuthC: encryption of AuthC;
Ns: random number generated by the server;
AuthS: signature generated by the server;
M2: second message;
eNs: encryption of Ns;
eAuthS: encryption of AuthS;
G: shared secret.

SUMMARY

It is an object of the invention to provide a further improved establishment of a secure communication between two network devices compared to the prior art as described above, which involves low utilization of resources and in particular enables to easily detect and distinguish different error cases during the setup.

The solution according to the invention is provided by a method, a computer program product, and an arrangement with the features of the independent claims. Preferred embodiments are specified in the dependent claims.

Accordingly, the invention proposes a method for establishing a secure communication between a first network device (initiator) and a second network device (responder) in a communication network, in which a symmetric cryptosystem is used to perform a respective separate authentication with respect to the first and second network devices before generating a secret to be used as a shared key for the secure communication. Due to the symmetric cryptosystem, each of the two network devices uses the same secrets as keys for encryption and decryption of data sets.

Furthermore, a computer program product is accordingly proposed, which causes the execution of such a method, as well as an arrangement that is suitable in particular for carrying out the method and which comprises a first network device and a second network device in a communication network.

Significant advantages therefore can be seen in
that the solution of the invention is based on a previously agreed shared secret and consequently no great amount of computation is necessary, which is otherwise required in asymmetric cryptosystems;
that the solution of the invention allows early verification of whether the alleged identities of the communication partners can be confirmed, so that in case of an accidental or deliberately irregular communication setup, resources that were occupied thereby can be released faster;
that due to the respective separate authentication, possible error cases can be easily distinguished, and finally, secret keys that are shared between the communication partners are provided for securing the subsequent communication; and
that with successful completion of the connection setup for a secure communication it is ensured that both parties have calculated the same shared keys.

Thus, in preferred embodiments the invention is particularly suitable for embedded systems that have very low resources, in particular for industrial controllers that are implemented as embedded real-time systems with limited resources and short response time.

BRIEF DESCRIPTION OF THE DRAWINGS

The aforementioned and further properties, features, and advantages of the invention will become more apparent from the following description of preferred exemplary embodiments with reference to the accompanying drawings, wherein.

DETAILED DESCRIPTION

Figure 1:
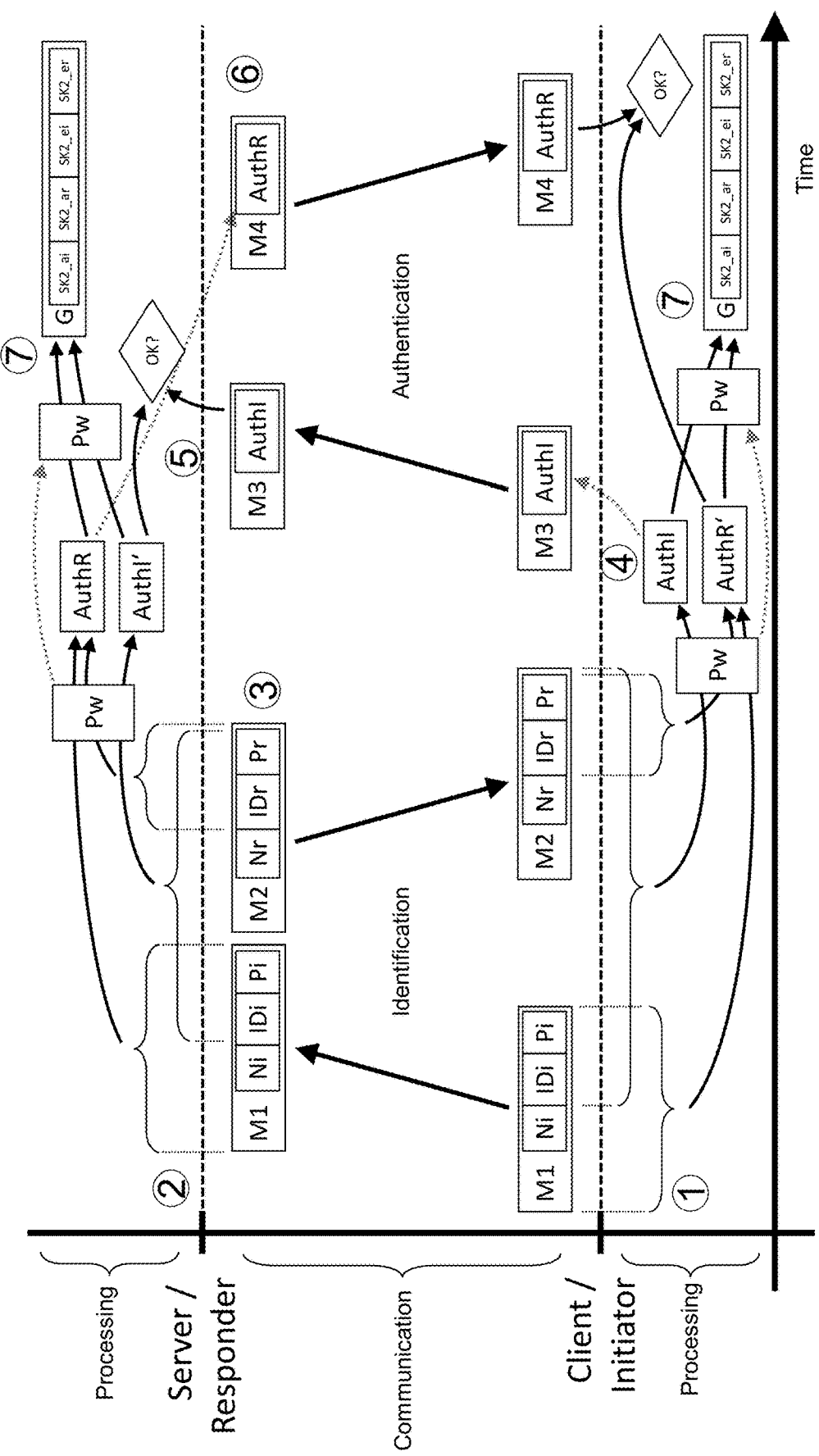
FIG. 1 is a basic process flow diagram of the setup of a secure communication according to the invention.

Reference will now be made in particular to FIG. 1 which shows a basic scheme of a preferred procedure within the scope of the invention for establishing a secure communication.

In detail, FIG. 1 shows a preferred embodiment for establishing a secure communication between a first network device, referred to as client/initiator in FIG. 1, and a second network device, referred to as server/responder in FIG. 1, in a communication network, the communication network being not shown in greater detail here for reasons of clarity. As can be seen from FIG. 1, a symmetrical cryptosystem or symmetric cryptography is used here, which means that both network devices use the same secrets as keys for encryption and decryption of data sets for performing a respective separate authentication with respect to the first and second network devices, and this before a secret G is generated that is to be used for secure communication as a shared key Pw.

The invention accordingly combines authentication by means of a pre-shared secret using symmetric cryptographic algorithms and a separate authentication step prior to deriving shared keys for securing the subsequent communication. A separate authentication step has otherwise only been known from authentication using asymmetric cryptography. The separate step is necessary when using asymmetric algorithms, because the subsequent communication, after asymmetric authentication, is secured with symmetric methods in the prior art. In prior art symmetrical processes, by contrast, it finds no use, as discussed above in the introductory part.

Before some favorable refinements within the scope of the invention will be described with reference to the preferred embodiment illustrated in FIG. 1, relating to the establishment of a secure communication between two network devices, wherein one of the network devices that is referred to as client or initiator below, initiates the setup, and the other network device that is referred to as server or responder below with which the communication is desired, responds to the setup request, a basic overview of the reference signs contained in FIG. 1 is given in the following list.

Pw: pre-shared secret or shared secret known in advance;
M1: first message;
IDi: identity of the client;
Ni: random number newly generated by the client;
Pi: optional parameter set from the client;
M2: second message;
IDr: identity of the server;
Nr: random number newly generated by the server;
Pr: optional parameter set from the server;
M3: third message
AuthI: signature generated by the client using a symmetric cryptographic algorithm for its authentication;
AuthI': signature computed by the server for verification purposes for comparison with AuthI for authentication of the client;
M4: fourth message;
AuthR: signature generated by the server using a symmetric cryptographic algorithm for its authentication;
AuthR': signature computed by the client for verification purposes for comparison with AuthR for authentication of the server;
G: second shared secret, including the following components:
SK2_ai: "secret key for authenticating messages sent by the initiator"; secret key for authenticating the messages transmitted by the client;
SK2_ar: "secret key for authenticating messages sent by the responder"; secret key for authenticating the messages transmitted by the server;
SK2_ei: "secret key for encrypting messages sent by the initiator"; secret key for encrypting the messages transmitted by the client;
SK2_er: "secret key for encrypting messages sent by the responder"; secret key for encrypting the messages transmitted by the server.

Accordingly, based on FIG. 1, it is contemplated according to a favorable embodiment that first a data set containing at least one random number Ni is generated on a first network device (referred to as client or initiator in FIG. 1), and then this data set together with an identifier IDi of the first network device is transmitted from the first network device to a second network device, in a first message M1. Thus, the first network device hereby initiates the setup of a secure communication with the second network device. The second network device may initially basically be selected by the first network device, for example from an internally stored list of possible network devices with which a secure communication can or is allowed to be performed within a communication network.

Following receipt of the first message M1, a data set can then be generated on the second network device (referred to as server or responder in FIG. 1), which data set likewise contains at least one random number Nr, and which is then transmitted from the second network device to the first network device, together with an identifier IDr of the second network device, in a second message M2. In this way, the second network device thus responds to the request of the first network device to establish a secure communication.

An advantage hereof is that the identity of the first network device is communicated to the second network device already upon initiation, so that the second network device is given the opportunity to decide whether a secure communication with the first network device can or is allowed to be performed at all within the communication network. According to a favorable refinement, it is therefore furthermore contemplated that, after receiving the first message M1, the second network device first verifies the identifier IDi transmitted by the first network device, and based on the result of this verification the second network device decides whether at all the message M2 is transmitted from the second network device to the first network device, as described above, or whether the setup is aborted as soon as the identity of the first network device has become known. If the second network device agrees with the setup, the first network device will thus receive the identity of the second network device, with the message M2 from the latter. This again opens up the early possibility of deciding, on the part of the first network device, whether the identity transmitted by the second network device actually corresponds to that network device with which the first network device intended to establish a connection for secure communication. According to a favorable refinement it is therefore contemplated that, after receiving the second message M2, the first network device first performs a verification of the identifier IDr transmitted by the second network device, and based on the result of this verification the first network device decides whether to continue or to abort the setup.

Therefore, a further advantage is that already at these points in time the possibility is offered on both sides to recognize at an early stage whether a request for establishing a secure communication or a response to such request is misdirected, without any need for cryptographic operations. The generation of the data sets including the random numbers Ni or Nr requires no cryptographic operations and therefore no allocation of large resources. Consequently, this generation can be performed in an expedient manner at an early stage, with the intention of being able to use these data sets for subsequent authentication if appropriate, without the need for a separate exchange of messages for this purpose.

Assuming that the setup is continued, the invention contemplates, after receipt of the second message M2, that the first network device generates a data set which contains a first signature AuthI and which is then transmitted, in a third message M3, from the first network device to the second network device. The first network device thus authenticates itself to the second network device. The first signature AuthI is generated by executing a first algorithm using a first secret Pw and data to be signed, which are composed of a first message part of the first message M1 and a second message part of the second message M2.

Furthermore, the second network device generates a data set containing a second signature AuthI', likewise by executing the first algorithm and using the first secret Pw and data to be signed, which are composed of the same first message part of the first message M1 and the same second message part of the second message M2 as in the generation of the data set containing the first signature "AuthI". Consequently, the second network device is thus able to perform an authentication of the first network device after receiving the third message M3. For this purpose, the second network device compares the data set generated by the first network device and containing the first signature AuthI with the data set generated by the second network device and containing the second signature AuthI'.

Consequently, both network devices can use a symmetric cryptographic algorithm for generating the signatures AuthI and AuthI', respectively, since for this purpose they both rely on the first and thus shared secret Pw and compose the data to be signed from the same message parts of the messages M1 and M2.

Thus, the separate authentication of the identity of the first network device opens the possibility for the second network device, in turn, to decide whether the setup of a secure communication with the first network device is to be continued. According to a favorable refinement, it is therefore furthermore contemplated that the second network device is responsive to the result of the comparison of the first signature AuthI with the second signature AuthI' to decide whether the establishment of a secure communication is continued or whether the procedure is aborted at this point.

Assuming that the setup is continued, the invention contemplates that subsequently a data set is generated on the second network device, which contains a third signature AuthR, and is transmitted from the second network device to the first network device in a fourth message M4. The second network device thus authenticates itself to the first network device. The generation of the third signature AuthI is favorably performed by executing a second algorithm using the first secret Pw and data to be signed, which are composed of a third message part of the first message M1 and a fourth message part of the second message M2, wherein the third message part is a message part other than the first message part, and/or wherein the fourth message part is a message part other than the second message part.

Further, a data set containing a fourth signature AuthR' is generated on the first network device by executing the second algorithm using the first secret Pw and data to be signed, which are composed in correspondence to the third signature AuthR, from the same third message part of the message M1 and the same fourth message part of the message M2 as in the generation of the third signature AuthR. Consequently, the first network device is thus able to perform an authentication of the second network device after receiving the fourth message M4. For this purpose, the first network device compares the data set generated by the second network device and containing the third signature AuthR with the data set generated by the first network device and containing the fourth signature AuthR'.

Thus, the separate authentication of the identity of the second network device opens the possibility for the first network device, in turn, to decide whether the setup of a secure communication with the second network device is to be continued. According to a favorable refinement, it is therefore furthermore contemplated that the first network device is responsive to the result of the comparison of the third signature AuthR with the forth signature AuthR' to decide whether the establishment of a secure communication is continued or whether the procedure is aborted at this point.

Assuming that the setup is continued, the invention contemplates that subsequently a second secret G can be generated on the first network device and on the second network device, respectively, by executing a third algorithm and by using the first secret Pw and at least one of the data sets previously generated on the first network device and/or on the second network device, i.e.

the data set containing at least the random number Ni;
the data set containing at least the random number Nr;
the data set containing the first signature AuthI;
the data set containing the second signature AuthI';
the data set containing the third signature AuthR; and/or
the data set containing the fourth signature AuthR'.

In this case, the second secret G may preferably be a combination of a plurality of cryptographic keys, in particular a combination of the cryptographic keys SK2_ai, SK2_ar, SK2_ei, and SK2_er mentioned above based on FIG. 1.

It should be noted that the generation of the second secret G on the second network device is already initiated after a positive comparison, on the second network device, of the data set generated by the first network device and containing the first signature AuthI with the data set generated by the second network device and containing the second signature AuthI'.

This second shared secret G is then used by the first network device and the second network device as a shared key for a secure communication between the first network device and the second network device, in particular for signing and/or encrypting the data sets communicated during such communication.

In a practical implementation, the first and the second network devices only use generated data sets including the same data in each case for generating the second secret G. In particular, it is thus contemplated that the first and second network devices use at least one of the data sets containing a random number Ni, Nr in each case, and/or, as regards the first network device, favorably at least one of the data sets containing the first signature AuthI, third signature AuthR or fourth signature AuthR', and as regards the second network device, favorably at least one of the data sets containing the first signature AuthI, second signature AuthI', or third signature AuthR.

In a favorable embodiment within the scope of the invention it is furthermore possible that the first secret Pw is permanently stored on the first network device and on the second network device, or that it is entered via an input interface. In the case that the secret Pw is entered, this input may be intended for a single use in each case, i.e. intended to be input each time the setup of a secure communication is initiated, or for multiple use, i.e. for repeatedly initiating a setup of a secure communication. For the respective use of this first secret Pw, advantageously, either the first secret Pw may be used directly on both network devices, or a value based on the first secret Pw and derived in identical manner may be used on both network devices.

Alternatively, however, it is also possible that the first secret Pw is stored on one of the two network devices, and that a value derived on the basis of the first secret Pw is stored on the other one of the two network devices or is input via an input interface. In the latter case, an identically derived value based on the first secret Pw is employed when using the first secret Pw for both network devices.

Thus, both network devices always use the same secret Pw or an identical value derived from the secret Pw. Depending on the embodiment, the deriving of such a value can thus be effected on such a respective network device or, alternatively, prior to entering such a value into the network device.

When an identically derived value is used, an identical derivation procedure used for this purpose can therefore favorably be performed for the network device either on the network device or before it is introduced into the network device in each case, depending on the specific practical implementation.

As can be seen in FIG. 1, it is furthermore preferably contemplated that the first message M1 additionally contains a parameter set Pi, and/or that the second message M2 additionally contains a parameter set Pr. Depending on the specific implementation, it may be favorable here for the parameter set Pi to include the first algorithm, the second algorithm, the third algorithm, a rule for deriving a value based on the first secret Pw, an identification of respective message parts for generating signatures, and/or an identifier of the second network device. The parameter set Pr may similarly include, depending on the specific implementation, the first algorithm, the second algorithm, the third algorithm, a rule for deriving a value based on the first secret Pw, and/or an identification of respective message parts for generating signatures.

As can also be seen from FIG. 1, the first and/or third message part of the first message M1 is preferably formed without using the random number Ni contained in this message.

Additionally or alternatively, the second and/or fourth message part of the second message M2 is preferably formed without using the random number Nr contained in this message.

The invention moreover offers the possibility that, in practical implementation, the above-described steps for establishing a secure communication can also be performed if there is already a communication relationship existing between the first network device and the second network device, in order to subsequently make this existing communication relationship secure.

Figure 2:
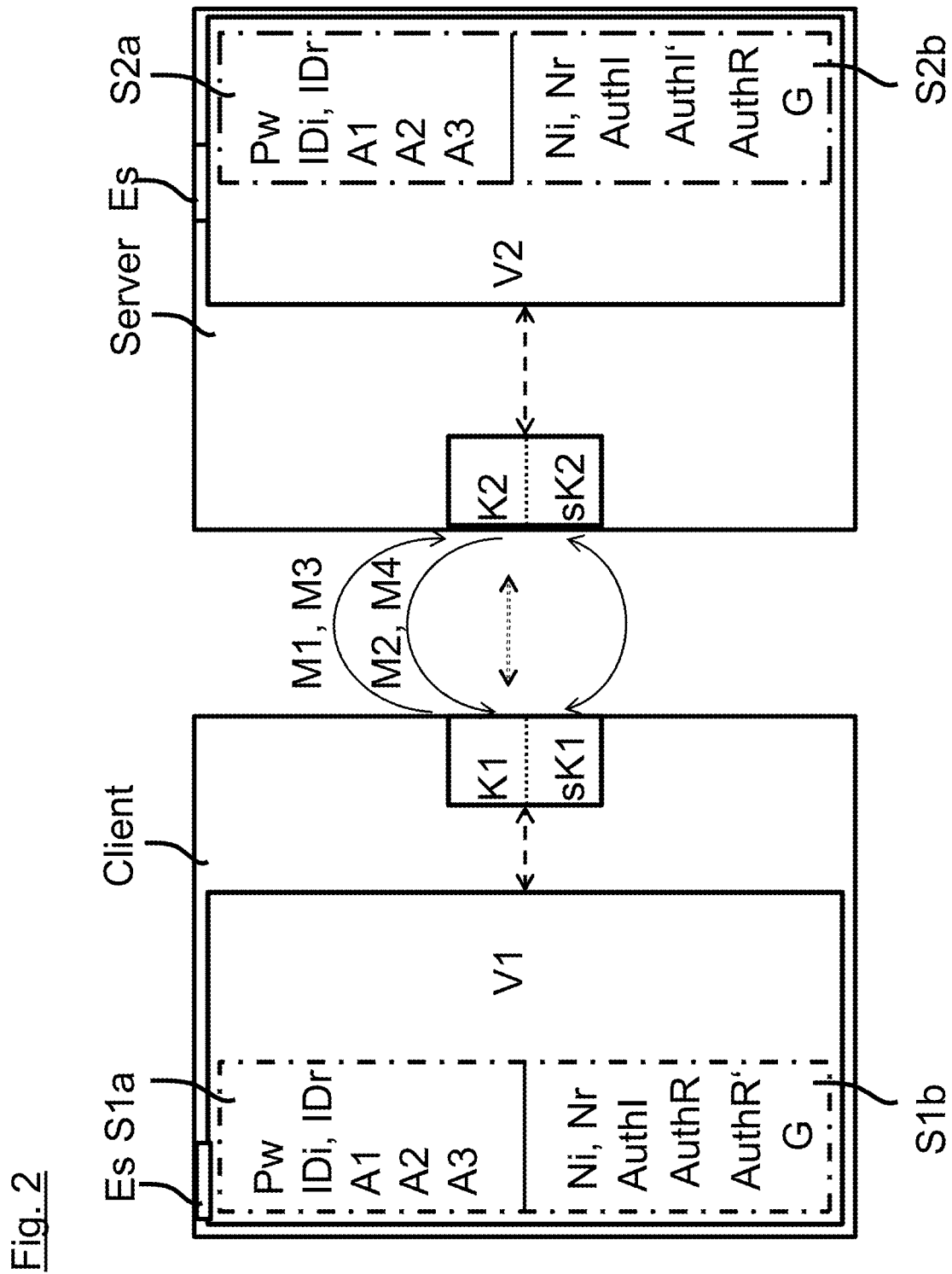
FIG. 2 is a schematic view of an example of an arrangement comprising a first and a second network device in a communication network according to the invention.
Figure 3:
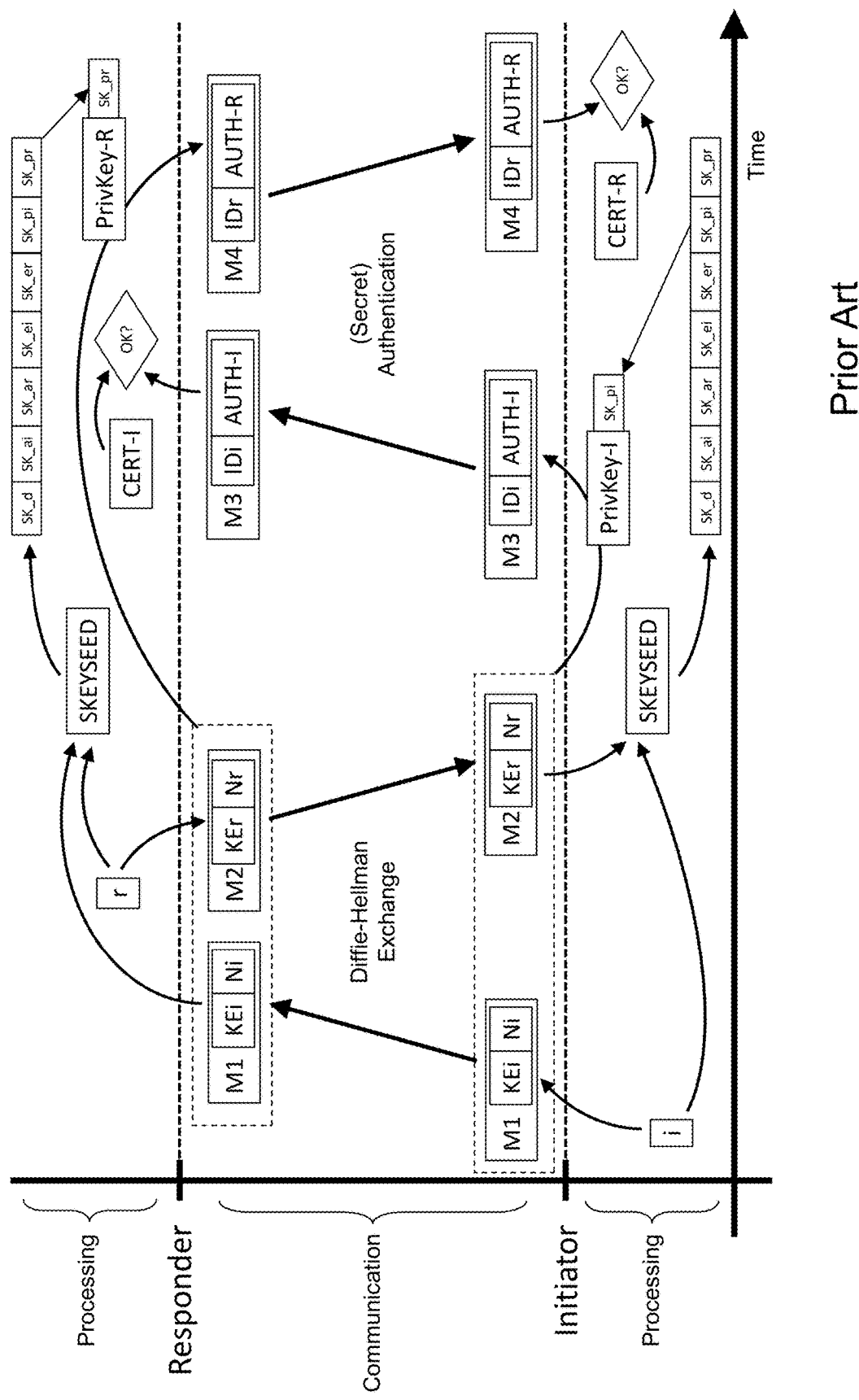
FIG. 3 is a basic process flow diagram according to the prior art, for communication setup according to IKEv2.
Figure 4:
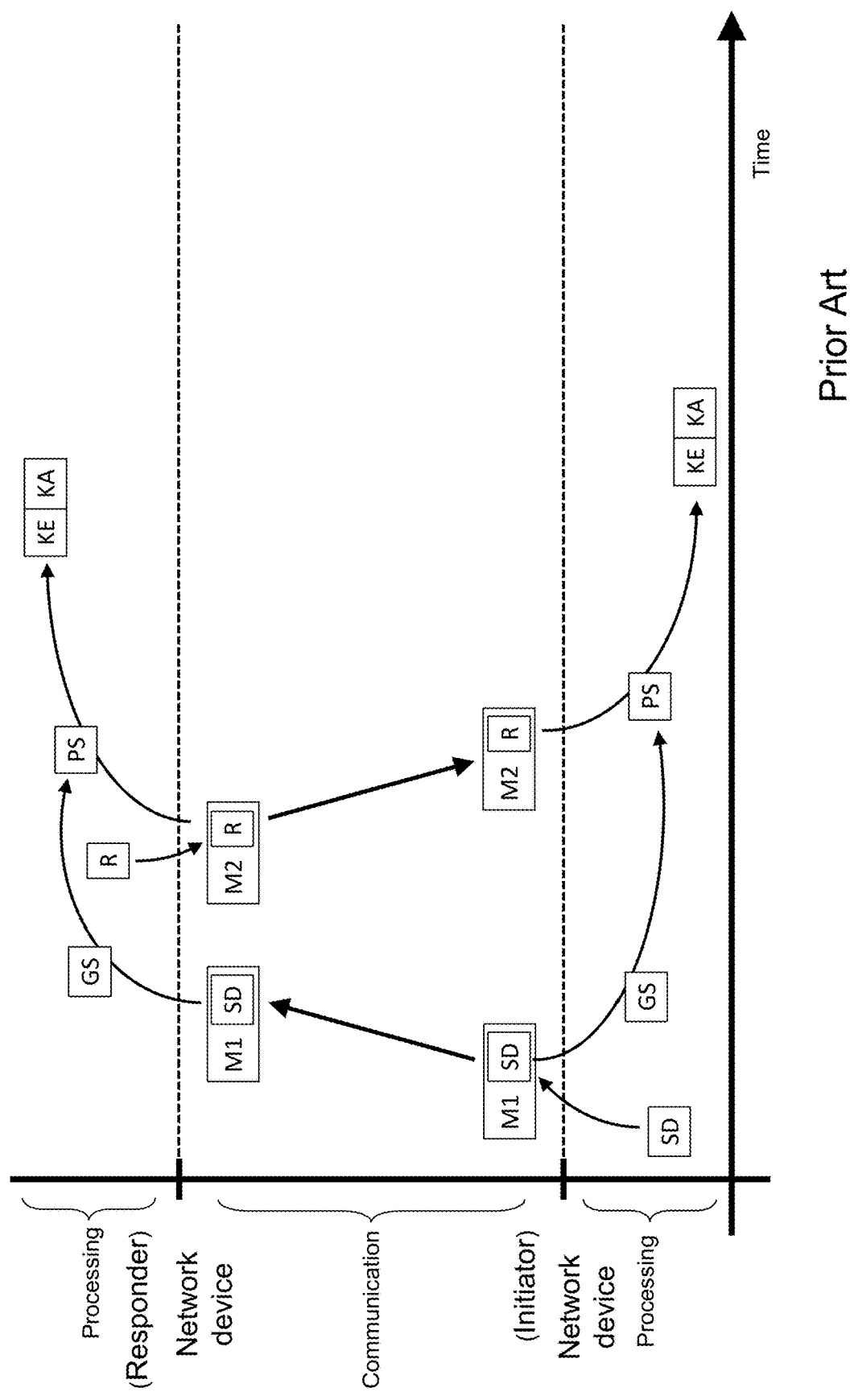
FIG. 4 is a basic process flow diagram according to the prior art, for communication setup according to DE 10 2012 220 990 B3.
Figure 5:
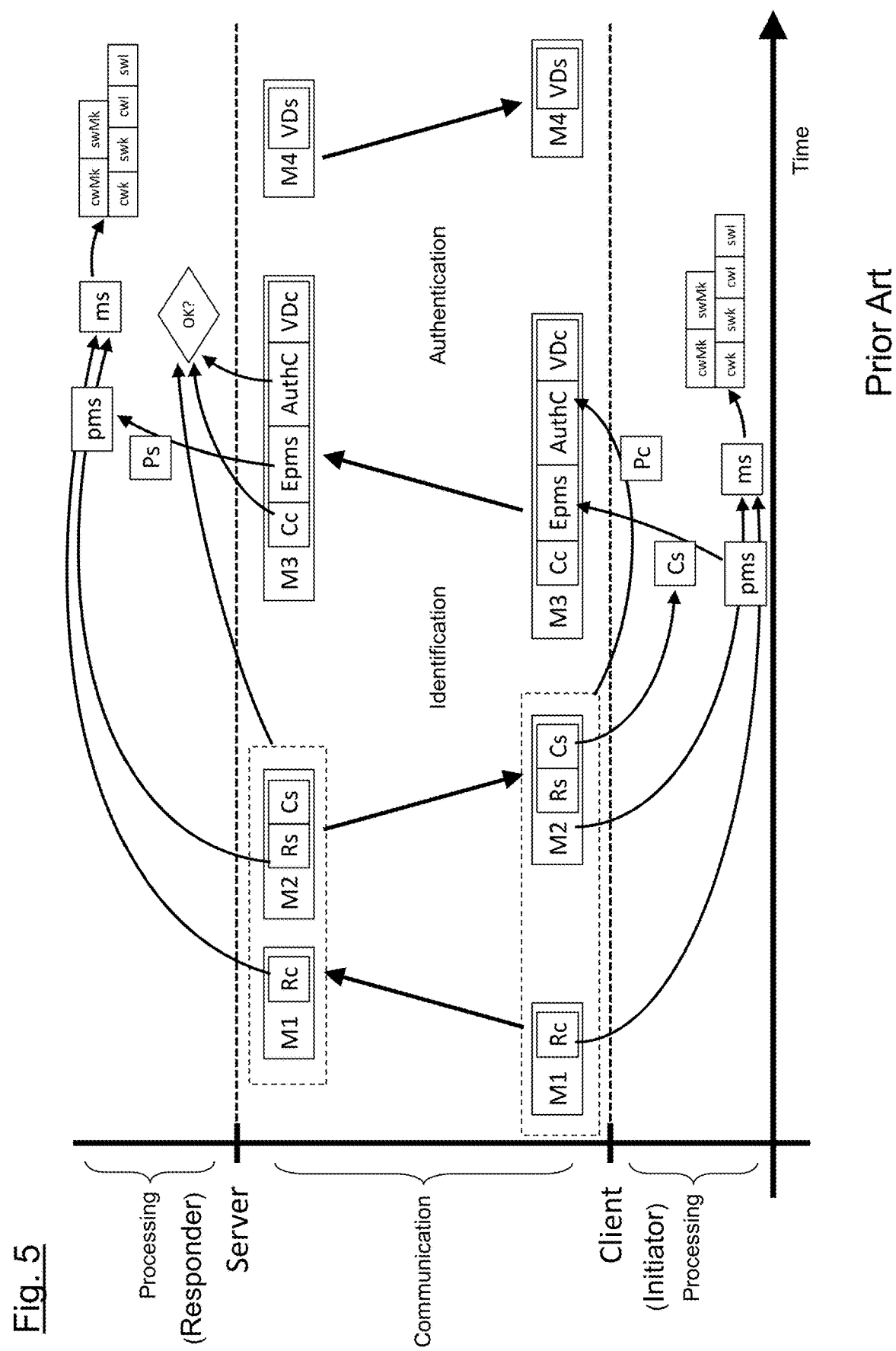
FIG. 5 is a basic process flow diagram according to the prior art, for communication setup according to TLS without Diffie-Hellman.
Figure 6:
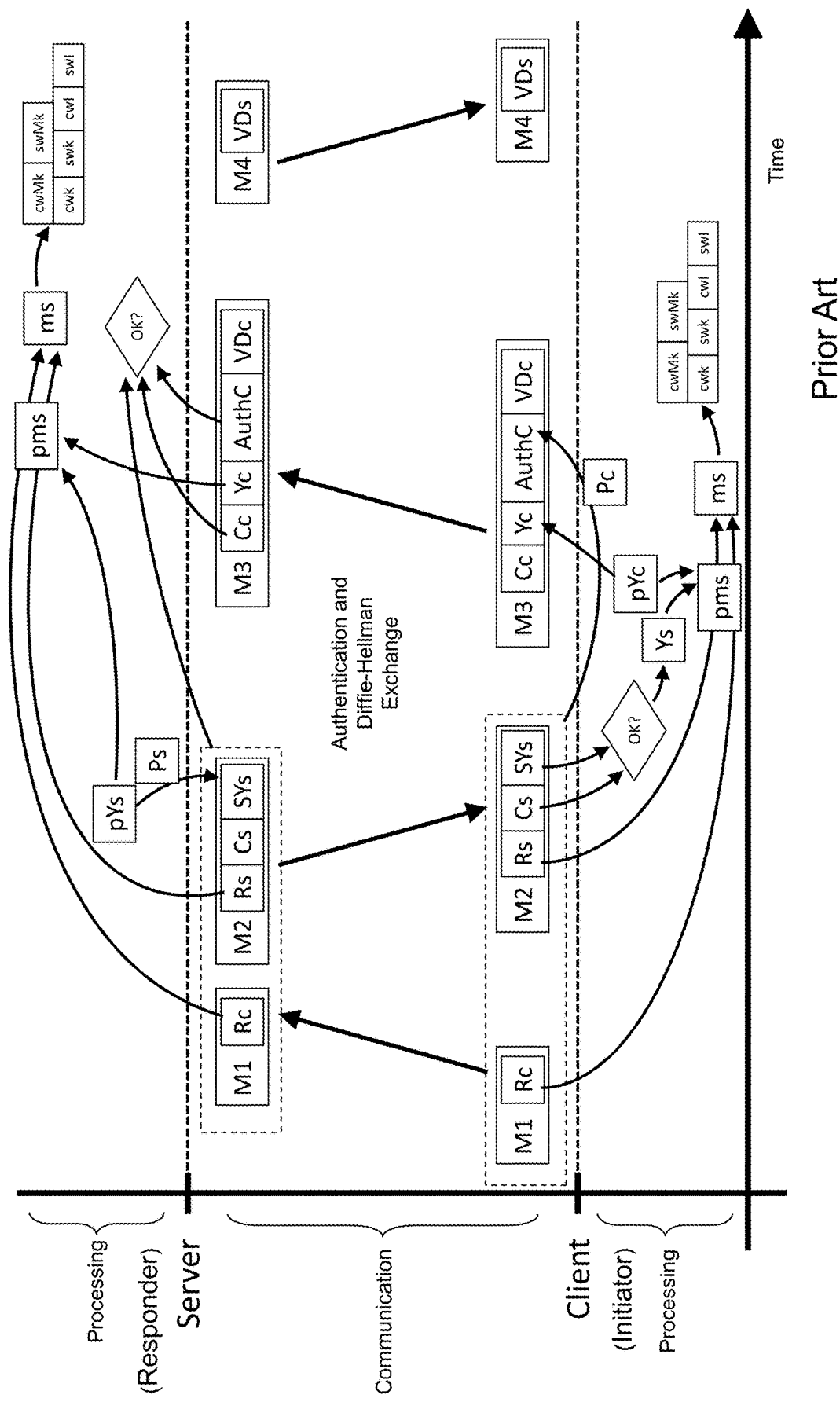
FIG. 6 is a basic process flow diagram according to the prior art, for communication setup according to TLS with Diffie-Hellman.
Figure 7:
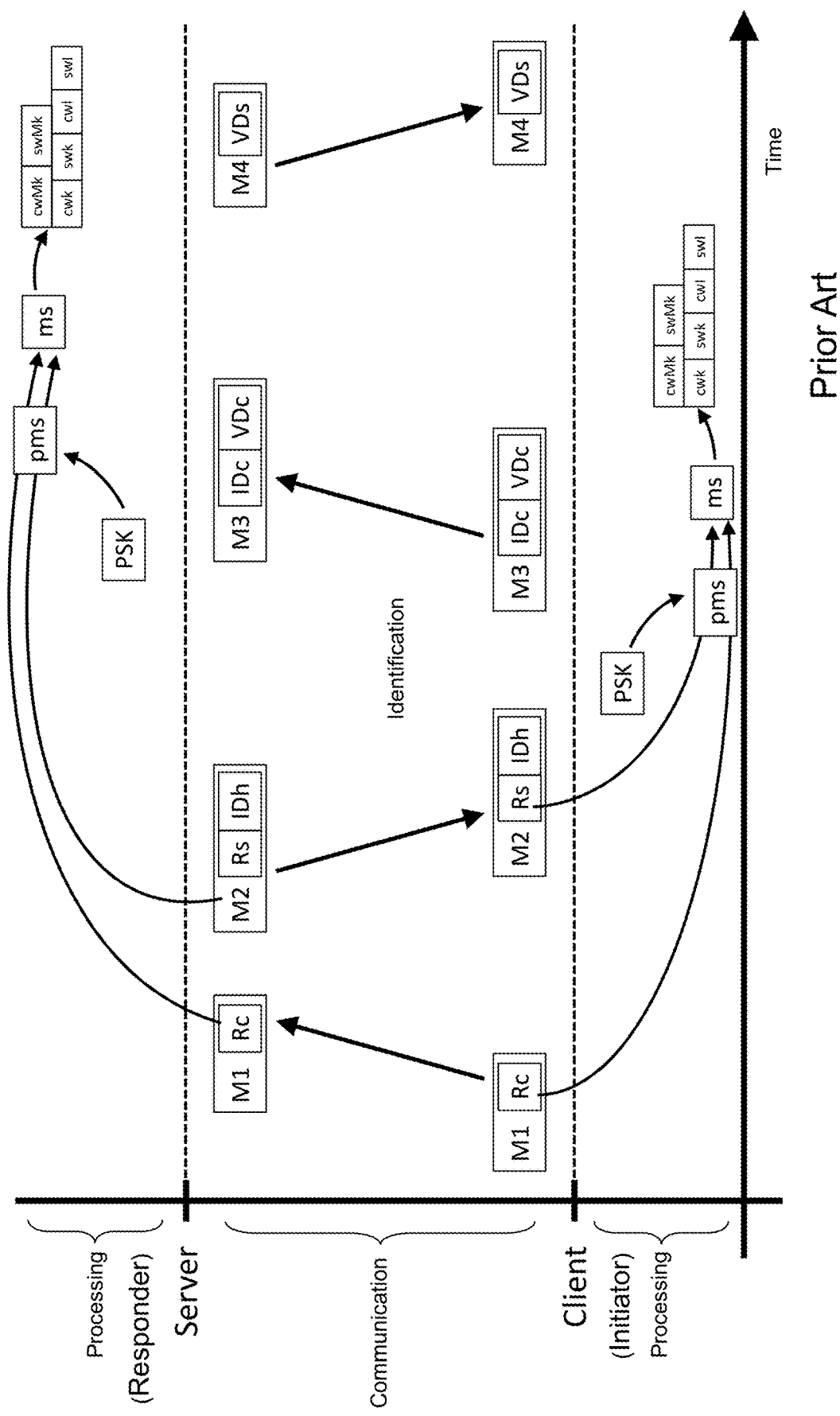
FIG. 7 is a basic process flow diagram according to the prior art, for communication setup according to TLS with PSK.
Figure 8:
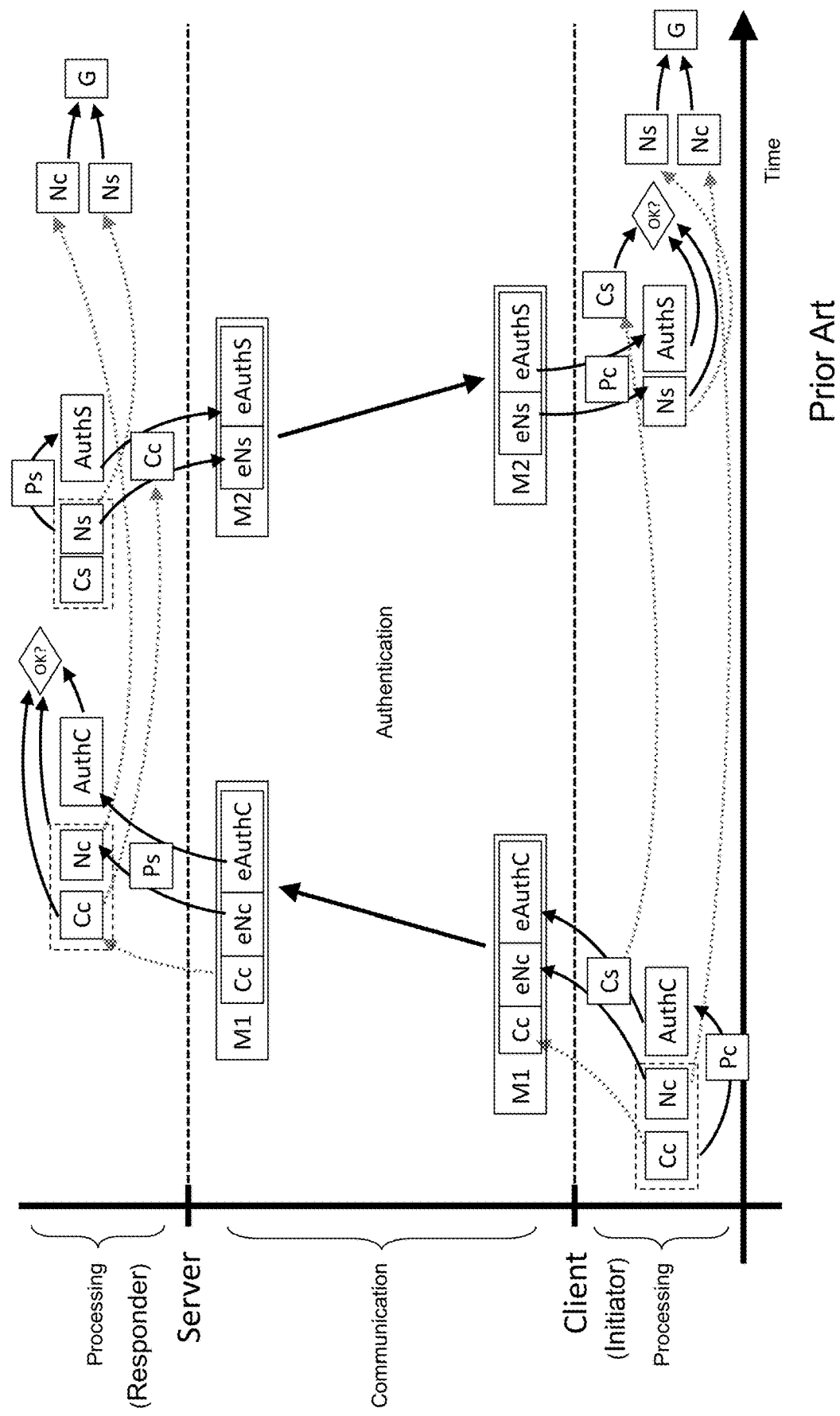
FIG. 8 is a basic process flow diagram according to the prior art, for establishing a secure connection according to OPC UA.

FIG. 2 shows a strongly simplified schematic view of an exemplary arrangement comprising a first network device and a second network device in a communication network for carrying out a method according to the invention. In particular, an exemplary arrangement including a first network device that is referred to as a client and a second network device that is referred to as a server are shown in a communication network which is not illustrated in further detail for reasons of clarity. There may already be a non-secured communication connection existing between the first network device and the second network device, as represented by the dotted double arrow.

In the first network device, a first processing means V1, a first communication means K1, and a first secure communication means sK1 are shown, and in the second network device a second processing means V2, a second communication means K2, and a second secure communication means sK2. Thus, a non-secured communication connection is achieved in particular via communication means K1 and K2. Especially the processing means V1, V2 and the secure communication means sK1, sK2 may comprise hardware and/or software components. In a hardware implementation, the respective means may be entirely or partly implemented as a device or as part of a device, for example as a computer or as a microprocessor. In a software implementation, the respective means may be entirely or partly implemented as a computer program product, as a function, as a routine, as part of a program code or as an executable object. In particular for carrying out a method according to the invention, the processing means V1 and V2, the communication means K1 and K2, and the secure communication means sK1 and sK2 are favorably implemented as explained below.

The first processing means V1 is adapted to initially generate a data set containing at least a random number Ni, and the first communication means K1 is adapted to transmit, from the first network device to the second network device, a first message containing this data set and at least one identifier IDi of the first network device.

The second processing means V2 is adapted to generate a data set containing at least a random number Nr, and the second communication means K2 is adapted to transmit, from the second network device to the first network device, a second message containing this data set and at least one identifier IDr of the second network device.

Moreover, the communication means K1 and K2 are suitably adapted to receive messages that have been sent via the communication means K2 and K1, respectively.

Furthermore, the first processing means V1 is adapted to execute a first algorithm A1 for generating a data set containing a first signature AuthI, using a first secret Pw and data to be signed, wherein the first processing means V1 is adapted to compose these data to be signed from a first message part of the first message M1 and a second message part of the second message M2. The first communication means K1 is furthermore adapted to transmit a third message M3 containing this generated data set from the first network device to the second network device.

The second processing means V2 is furthermore adapted to execute the first algorithm A1 in order to generate a data set containing a second signature AuthI', using the first secret Pw and data to be signed, wherein the second processing means V2 is adapted to compose these data to be signed from the same first message part of the first message M1 and the same second message part of the second message M2 as the first processing means V1 when generating the data set containing the first signature AuthI. The second processing means V2 is furthermore adapted to compare the data set generated by the first network device and containing the first signature AuthI with the data set generated by the second network device and containing the second signature AuthI'.

Furthermore, the second processing means V2 is adapted to execute a second algorithm A2 for generating a data set containing a third signature AuthR, using the first secret Pw and data to be signed, wherein the second processing means V2 is adapted to compose these data to be signed from a third message part of the first message M1 and a fourth message part of the second message M2, wherein the third message part is a message part other than the first message part and/or the fourth message part is a message part other than the second message part, and wherein the second communication means K2 is furthermore adapted to transmit a fourth message M4 containing this generated data set from the second network device to the first network device.

The first processing means V1 is likewise adapted to execute the second algorithm A2 on the first network device in order to generate a data set containing a fourth signature AuthR', using the first secret Pw and data to be signed, wherein the first processing means V1 is furthermore adapted to compose these data to be signed in correspondence to the third signature AuthR, from the same third message part of the first message M1 and the same fourth message part of the second message M2 as the second processing means V2 when generating the data set containing the third signature AuthR, and wherein the first processing means V1 is adapted to compare the data set generated by the second network device and containing the third signature AuthR with the data set generated by the first network device and containing the fourth signature AuthR'.

Both the first V1 and the second processing means V2 are furthermore adapted to execute a third algorithm A3 for respectively generating a shared second secret G, using the first secret Pw and at least one of the data sets containing the random number Ni, the random number Nr, the first signature AuthI, the second signature AuthI', the third signature AuthR, or the fourth signature AuthR'.

The first and second secure communication means sK1 and sK2 are finally adapted to use the shared second secret G as a shared key for a secure communication between the first network device and the second network device, i.e. in particular for authenticating and/or for encrypting and decrypting data sets for performing a secure communication. In practical implementation, the transmission and reception of correspondingly secured data sets can then be effected also via the secure communication means sK1 and sK2, or again via the communication means K1 and K2, depending on the specific device.

Consequently, in practical implementation and as already mentioned above, the communication means K1 and K2 are suitably adapted for receiving messages that have been transmitted via communication means K2 and K1, respectively, i.e. the communication means K1 is in particular adapted at least for receiving the messages M2 and M4, and the communication means K2 at least for receiving the messages M1 and M3.

Furthermore, memories are shown in the arrangement according to FIG. 2, which, for reasons of illustration, are subdivided into two respective memory areas S1a and S1b, as well as S2a and S2b, and which can in particular be accessed by the processing means V1 or V2.

For example, the memory area S1a of the client may store the first secret Pw, the identities IDi and IDr, and the first, second, and third algorithms A1, A2, and A3, either permanently and/or when entered via an input interface Es.

Depending on the specific configuration, it is however also possible that, for example, the first algorithm, the second algorithm, the third algorithm, a rule for deriving a value based on the first secret Pw, and/or an identification of respective message parts for generating signatures are transmitted from the server to the client, which are then stored in memory area S1a, for example.

The memory area S2a of the server may likewise store the first secret Pw, the identifier IDr and the first, second, and third algorithms A1, A2 and A3, either permanently and/or when entered via an input interface Es.

However, depending on the specific configuration, it is also possible that, for example, the first algorithm, the second algorithm, the third algorithm, a rule for deriving a value based on the first secret Pw, an identification of respective message parts for generating signatures, and/or an identifier of the second network device are transmitted from the client to the server, which are then stored in memory area S2a.

The memory areas S1b and S2b of the client and server, respectively, may store, for example, the random numbers Ni and Nr, the second secret G, and the signatures AuthI, AuthR, and AuthR', or the random numbers Ni and Nr, the second secret G, and the signatures AuthI, AuthI', and AuthR, respectively.

The identifier ID may also be stored in the memory area S2a or S2b of the server, at least if the processing means V2 shall be able to make use of it, depending on the further implementation described below.

Thus, again referring in particular to FIG. 1, in particularly useful embodiments of the invention for establishing a secure communication, hereinafter also referred to as connection setup (i.e. for a secure communication), a shared secret Pw is known to both network devices, i.e. the initiator and the responder, prior to this connection setup.

The notification may be effected prior to each connection setup, for example if a network device has an input unit or input interface and a user of the network device enters the secret Pw immediately before the connection is established. The notification of Pw may as well be made once for several or all subsequent connection setups, for example if the network device is an embedded system in field application, without user on site during operation thereof. In the latter example, the secret Pw may as well be included in the configuration of the network device or of a device containing this network device.

In particular it is thus possible for the secret Pw to be stored on both network devices in advance, or the secret Pw can be stored in advance on the second network device and the secret Pw can be entered on the first network device by a user before each connection setup, or the secret Pw can be stored in advance on the second network device and the secret Pw can be entered on the client in advance, by a user, for being used for a plurality of subsequent connection setups.

First, in a step of the connection setup indicated by reference numeral 1 in FIG. 1, the client generates a message M1 and transmits it to the server. Message M1 includes the identity IDi of the client, a random number Ni newly generated by the client, and optionally a parameter set Pi. The parameter set Pi may indicate algorithms which are to be used by the network devices for authentication during the connection setup. Pi may, for example, indicate algorithms which should be used after the completion of the connection setup for protecting the further communication. It is advantageous if the client indicates the assumed or desired identity of the server in the parameter set Pi. Since in this case the server is able to decide when processing M1, whether the connection setup to itself is really desired or was misdirected. The indication of the assumed or desired identity is particularly advantageous if the server itself has different identities, for example different identities for communication with different groups of clients, or a respective identity for each service it provides.

Then, in a step indicated by reference numeral 2 in FIG. 1, the server processes the received message M1 and decides whether it agrees to establish a connection with the indicated identity IDi of the client. What is advantageous here is that no cryptographic operation is necessary in order to recognize misdirected requests for establishing a connection at this point.

If the server agrees with the connection setup, it responds to the client, in a step indicated by reference numeral 3 in FIG. 1, with a message M2 containing the server's identity IDr, a random number Nr it generated itself, and optionally a parameter set Pr. The parameter set Pr may, for example, indicate the combination of algorithms selected by the server for authentication during connection setup, for example in response to a set of algorithms proposed by the client, in Pi, for this purpose. Pr may as well indicate the combination of algorithms to be used after completion of the connection setup in order to protect the further communication, for example in response to a set of algorithms proposed by the client, in Pi, for this purpose.

In a step indicated by reference numeral 4 in FIG. 1, the client generates a message M3 and transmits it to the server. Message M3 includes a signature AuthI generated with symmetric cryptographic algorithms, in which the shared secret Pw is used as a key for generating the signature and the signed data are composed, for example, of the message M1 without the random number Ni and of the complete message M2. One possible algorithm for this is for instance a message authentication using HMAC-MD5 as described, for example, in: H. Krawczyk, M. Bellare and R. Canetti, "RFC 2104-HMAC: Keyed-Hashing for Message Authentication", Internet Engineering Task Force (IETF), 1997. As already mentioned before, a significant advantage of using a symmetric signature for embedded systems is in particular that this requires less resources (computational time and processing memory) than asymmetrical procedures.

In a step indicated by reference numeral 5 in FIG. 1, the server compares the signature AuthI from the message M3 with a self-calculated signature AuthI'. This tells the server if the client is in possession of the same secret Pw.

Subsequently, in a step indicated by reference numeral 6 in FIG. 1, and if the verification of the signature AuthI was positive, the server likewise transmits a self-generated signature AuthR to the client, in the message M4. Signature AuthR is also generated using a symmetric cryptographic algorithm, in which the shared secret Pw is likewise used as a signature key. This time, the signed data include, for example, the combination of the complete message M1 and the message M2, except for the random number Nr.

Suitable alternative variations with regard to the signatures AuthI and AuthR can be, for example:

a) AuthI=signature of M1 and M2, and using Pw, and AuthR=signature of M1 and M2, but without Nr, and using Pw;

b) AuthI=signature of M1 and M2, but without Nr, and using Pw, and AuthR=signature of M1 and M2, and using Pw;

c) AuthI=signature of M1 and M2, and using Pw, and AuthR=signature of M1, but without Ni, and of M2, and using Pw;

d) AuthI=signature of M1 but without Ni, and of M2, and using Pw, and AuthR=signature of M1 and M2, and using Pw.

In the context of particularly suitable embodiments of the invention it is essential that the values AuthI and AuthR are not the same. Otherwise, an attacker could possibly make a very simple attack if he is able to manipulate the exchanged messages, because he would no longer need the secret Pw for calculating AuthR, but simply includes the value of AuthI into the message M4 as the value of AuthR. It would thus be possible for the attacker, in particular without knowledge of Pw, to determine self-selected contents for the messages M1 and M3 in such a way that no manipulation is detected by the server.

In steps that are indicated by reference numeral 7 in FIG. 1, the server and the client derive a second secret G, from signatures AuthI and AuthR, using the first secret Pw. Secret G is in particular a combination of a plurality of cryptographic keys $SK2\_ai$, $SK2\_ar$, $SK2\_ei$, $SK2\_er$, which are used to secure the subsequent communication, for example by signing and/or encrypting/decrypting. For this purpose, the server and the client use previously agreed symmetric algorithms, such as HMAC-MD5, using Pw as a key and signatures AuthI and AuthR as data.

In a variation, merely the random numbers Ni and Nr may be used instead of the signatures AuthI and AuthR in the steps indicated by reference numeral 7 in FIG. 1. It should be noted, however, that when using at least one identical signature that is available in both network devices, either through self-generation or through reception, then the signed components of the messages M1 and M2, such as the identities IDi and IDr and/or the optional parameters Pi and Pr, will also be protected by encryption. By contrast, this is lacking if merely the values Ni and Nr are used. Moreover, it is necessary in this case to reserve main memory for the values Ni and Nr on the network devices or the devices accommodating these network devices, and this over a time long enough to hold them available until the algorithm A3 is executed. One of the signatures, by contrast, will much more likely still be in the main memory because of the immediately preceding comparison.

Possible variations with regard to the second secrets may therefore be, for example:

a) G=execution of A3 using Pw, Ni, Nr;

b) G=execution of A3 using Pw, AuthI, AuthR;

c) G=execution of A3 using Pw, Ni, AuthR;

d) G=execution of A3 using Pw, AuthI, Nr;

wherein, in the case of a positive comparison of the first signature with the second signature, AuthI' may optionally also be used instead of AuthI, i.e. upon verification of the presence of identical signatures on the second network device, and in the case of a positive comparison of the third signature with the fourth signature, i.e. upon verification of the presence of identical signatures, AuthR' may optionally also be used instead of AuthR on the first network device.

Only when the message M4 has successfully been transmitted by the server and the message M4 has successfully been received by the client, the network devices begin to secure the subsequent secure communication using the symmetric keys they have generated with the second shared secret G. An advantage hereof is that for the case that the verification of the signature AuthI by the server is negative, the server can still send, to the client, a response in plain text with a description of causes.

Since, according to the invention, identification and authentication take place or are initiated in separate steps, the identification with the exchange of messages M1 and M2, the authentication with the exchange of messages M3 and M4, the error cases arising due to mismatched identities or otherwise due to non-identical secrets Pw can be distinguished very easily.

An advantage of the separate authentications comprising the transmission, receipt, and processing of the messages M3 or M4 is that due to the respective verification of AuthR and AuthI the client and the server can be sure that they possess the same Pw and the same values of Ni and Nr. Consequently, they will use the same value of G for the subsequent protection of the communication, and therefore, errors in the verification of the subsequent communication (for example, signatures thereof) are not caused by faulty authentication but always by a transmission error or a manipulation. Thus, these errors can be distinguished.

As already mentioned above, it is not a prerequisite that a communication relationship is not yet existing between the first and second network devices before the method is applied. An existing communication relationship can later be made secure by applying the method according to the invention.

Moreover, as already indicated above, advantageous variants with respect to the first secret Pw are achieved when, throughout the connection setup (i.e. for secure communication), the network devices employ, when using the first secret, a value derived from Pw instead of Pw, for example a value generated from Pw using a keyed-Hash Message Authentication Code (HMAC) Function or a key derivation function, for example the aforementioned HMAC-MD5, or the Password-Based Key Derivation Function 2 (PBKDF2 function) as described in RSA Laboratories, "PKCS #5 v2.0: Password-Based Cryptography Standard", 1999.

Advantageously, features that are individual to the intended communication protocol may be incorporated in the derivation. This increases security, if the same secret is to be used in a network device for different communication protocols. The use of PBKDF2 is particularly advantageous, if the first network device has larger resources, such as a fast arithmetic unit, and a user enters the secret Pw, and the second network device only stores the value derived by PBKDF2, because in this case significantly less computational work will arise on the second network device that has scarce resources, but it is impossible to recover Pw by copying the value derived from Pw per PBKDF2.

Consequently, in the invention, when using the first secret Pw, the network device may as well employ a value derived from Pw instead of Pw, wherein Pw is suitably combined with a constant in the derivation, wherein the constant, for example, identifies the communication protocol used after the connection setup. Hence, this is particularly advantageous if the same two network devices communicate using different protocols and establish a secure connection according to the methods described above for each protocol. In this case, different secrets can be derived and employed for each communication protocol, instead of Pw. For an attacker, it will therefore be more difficult to divine the secret for each communication protocol.

Alternatively, for connection setup of the secure communication, it is also possible within the scope of the invention, by way of example, that one network device does not store the secret Pw itself, but rather a value derived therefrom, for example a value arising after application of a key derivation function on Pw. The other network device, by contrast, stores the secret Pw, or the latter is reentered before each connection setup and a derived value is recalculated before each use and is employed. Hence, this is particularly advantageous if a number of different network devices or devices accommodating them are to be accessed from a central entity using the same secret Pw and the derivation of Pw involves a network identity and/or device identity in each case. Since in this case, it will substantially be impossible for an attacker who "steals" one of these network devices or one of these devices and gets hold of the derivation of the secret Pw, to access the other devices in place of the control center, because it is not possible, or only with excessive effort, to determine the secret itself from the derivation of the secret Pw.

The invention claimed is:

1. A method for establishing a secure communication between a first computer network device and a second computer network device in a communication network, wherein a symmetric cryptosystem is used, so that each of the two computer network devices uses the same secrets as keys for encryption and decryption of data sets, for performing a separate authentication with respect to the first and second computer network devices before generating a secret to be used as a shared key for the secure communication, the method comprising the steps of:

(a) generating, on the first computer network device, a data set containing at least a random number; and transmitting a first message containing an identifier of the first computer network device and said generated data set from the first computer network device to the second computer network device;

(b) generating, on the second computer network device, a data set containing at least a random number; and transmitting a second message containing an identifier of the second computer network device and said generated data set from the second computer network device to the first computer network device;

(c) generating, on the first computer network device, a data set containing a first signature by executing a first algorithm using a first secret and data to be signed, which are composed of a first message part of the first message and a second message part of the second message; and transmitting a third message containing said generated data set from the first computer network device to the second computer network device;

(d) generating, on the second computer network device, a data set containing a second signature by executing the first algorithm using the first secret and data to be signed, which are composed of the same first message part of the first message and the same second message part of the second message as for the generation of the data set containing the first signature; and
comparing the data set generated by the first computer network device and containing the first signature with the data set generated by the second computer network device and containing the second signature;

(e) generating, on the second computer network device, a data set containing a third signature by executing a second algorithm using the first secret and data to be signed, which are composed of a third message part of the first message and a fourth message part of the second message, wherein the third message part is a message part other than the first message part and the fourth message part is a message part other than the second message part; and transmitting a fourth message containing said generated data set from the second computer network device to the first computer network device;

(f) generating, on the first computer network device, a data set containing a fourth signature by executing the second algorithm using the first secret and data to be signed, which are composed in correspondence to the third signature, of the same third message part of the message and the same fourth message part of the message as for the generation of the third signature; and comparing the data set generated by the second computer network device and containing the third signature with the data set generated by the first computer network device and containing the fourth signature;

(g) generating a respective second secret on the first computer network device and on the second computer network device, by executing a third algorithm in each case and using the first secret and at least one of the data sets previously generated in steps a), b), c), d), e), f);

(h) using the second shared secret by the first computer network device and the second computer network device as a shared key for a secure communication between the first computer network device and the second computer network device.

2. The method as claimed in claim 1, wherein in step (g) the first and second computer network devices only use generated data sets including the same data in each case, in particular at least one of the data sets containing at least a random number, at least one of the data sets containing the first, third, or fourth signature, and at least one of the data sets containing the first, second, or third signature.

3. The method as claimed in claim 1, wherein
after step (a), the second computer network device first verifies the identifier transmitted by the first computer network device, and based on the result of the verification, the second computer network device decides whether step (b) is initiated or the method is aborted after step (a);
after step (b), the first computer network device first verifies the identifier transmitted by the second computer network device, and based on the result of the verification, the first computer network device decides whether step (c) is initiated or the method is aborted after step (b);
after step (d), the second computer network device is responsive to the result of the comparison of the first signature with the second signature to decide whether step (e) is initiated or the method is aborted after step (d); and
after step (f), the first computer network device is responsive to the result of the comparison of the third signature with the fourth signature to decide whether step (g) is initiated or the method is aborted after step (f).

4. The method as claimed in claim 1, wherein the first secret is stored on the first computer network device and on the second computer network device or is entered via an input interface, in each case before step (a) is performed, or for performing step (a) repeatedly, wherein when the first secret is used on both computer network devices, either the first secret is employed directly, or a value is employed that has been derived from the first secret in identical manner, in particular by performing an identical derivation procedure for or by the two computer network devices.

5. The method as claimed in claim 1, wherein the first secret is stored on one of the two computer network devices, and a value derived on the basis of the first secret is stored on the other one of the two computer network devices or is entered via an input interface, in each case before step (a) is performed, or for performing step (a) repeatedly, wherein when the first secret is used on both computer network devices, a value is employed that has been derived on the basis of the first secret in identical manner.

6. The method as claimed in claim 1, wherein the first message additionally contains a parameter set comprising the first algorithm, the second algorithm, the third algorithm, a rule for deriving a value based on the first secret, an identification of respective message parts for generating signatures, and an identifier of the second computer network device; and the second message additionally contains a parameter set comprising the first algorithm, the second algorithm, the third algorithm, an identification of respective message parts for generating signatures, and a rule for deriving a value based on the first secret.

7. The method as claimed in claim 1, wherein
the first or the third message part of the first message is formed without using the random number contained in this message; and
the second or the fourth message part of the second message is formed without using the random number contained in this message.

8. The method as claimed in claim 1, wherein steps (a) through (h) are performed while a communication relationship is already existing between the first computer network device and the second computer network device in order to subsequently make this existing communication relationship secure.

9. A computer system, comprising:
a) a first computer network device, wherein the first computer network device comprises a first microprocessor and first program code that, when executed by the first microprocessor, causes the first computer network device to generate a data set containing at least a first random number and
to transmit over a communication network, from the first computer network device to a second computer network device, a first message containing an identifier of the first computer network device and the data set generated by the first computer network device;

b) wherein the second computer network device comprises a second microprocessor and second program code that, when executed by the second microprocessor causes the second computer network device to generate a data set containing at least a second random number and to transmit over the communication network, from the second computer network device to the first computer network device, a second message containing an identifier of the second computer network device and the data set generated by the second computer network device;

c) wherein the first computer network device is further adapted to execute a first algorithm on the first computer network device to generate a data set containing a first signature, using a first secret and data to be signed, wherein the first computer network device is further adapted to compose the data to be signed from a first message part of the first message and a second message part of the second message, and wherein a third message containing the generated data set is transmitted by the first computer network device to the second computer network device over the communication network;

d) wherein the second computer network device is further adapted to execute the first algorithm on the second computer network device to thereby generate a data set containing a second signature, using the first secret and data to be signed, wherein the second computer network device is further adapted to compose the data to be signed from the first message part of the first message and the second message part of the second message as by the first computer network device when generating the data set containing the first signature, and wherein the second computer network device is further adapted to compare the data set generated by the first computer network device and containing the first signature with the data set generated by the second computer network device and containing the second signature;

e) wherein the second computer network device is further adapted to execute a second algorithm for generating a data set containing a third signature, using the first secret and data to be signed, wherein the second computer network device is further adapted to compose the data to be signed from a third message part of the first message and a fourth message part of the second message, wherein the third message part is a message part other than the first message part and the fourth message part is a message part other than the second message part, and wherein a fourth message containing the generated data set is transmitted by the second computer network device to the first computer network device over the communication network;

f) wherein the first computer network device is further adapted to execute the second algorithm on the first computer network device for generating a data set containing a fourth signature, using the first secret and data to be signed, wherein the first computer network device is further adapted to compose the data to be signed in correspondence to the third signature, from the third message part of the first message and the fourth message part of the second message as by the second computer network device when generating the data set containing the third signature, and wherein the first computer network device is adapted to compare the data set generated by the second computer network device and containing the third signature with the data set generated by the first computer network device and containing the fourth signature;

g) wherein the first computer network device and second computer network device are each further adapted to execute a third algorithm for respectively generating a shared second secret using the first secret and at least one of the data sets containing the first random number, the second random number, the first signature, the second signature, the third signature, or the fourth signature; and h) wherein the first computer network device and second computer network device are each further adapted to use the shared second secret as a shared key for secure communication between the first computer network device and the second computer network device over the communication network.

* * * * *